June 11, 1929.  E. D. GRAY ET AL  1,716,632
PROCESS OF REFINING MINERAL LUBRICATING OILS
Filed Nov. 9, 1925
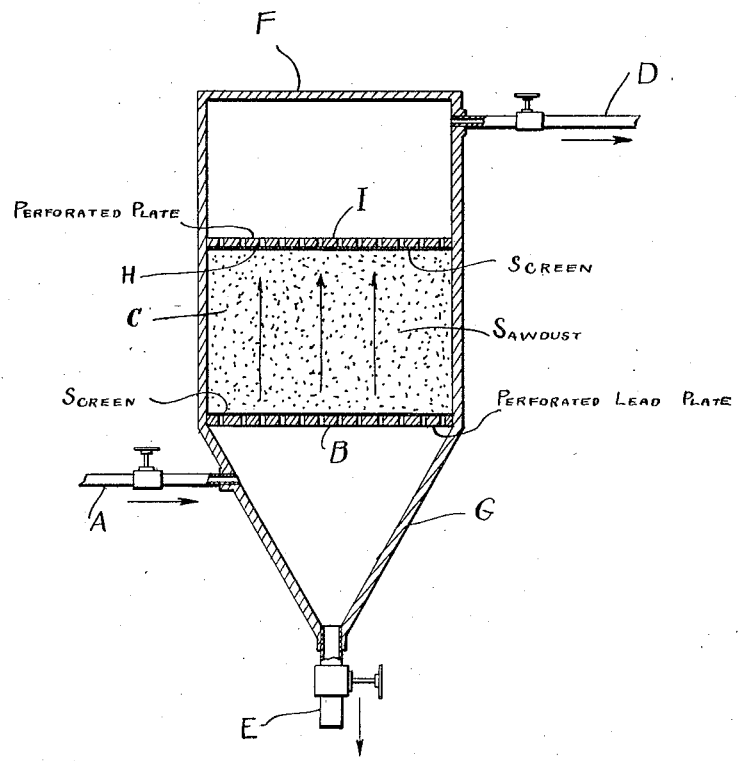
Inventors
Edwin D. Gray
Earle L. Scofield
Edward C. Defoe
By Lyon & Lyon Attorneys Patented June 11, 1929.

1,716,632

UNITED STATES PATENT OFFICE.

EDWIN D. GRAY, EARLE L. SCOFIELD, AND EDWARD C. DEFOE, OF RICHMOND, CALIFORNIA, ASSIGNORS, BY MESNE ASSIGNMENTS, TO STANDARD OIL COMPANY OF CALIFORNIA, OF SAN FRANCISCO, CALIFORNIA, A CORPORATION OF DELAWARE.

PROCESS OF REFINING MINERAL LUBRICATING OILS.

Application filed November 9, 1925. Serial No. 68,030.

This invention relates to an improved method of refining mineral lubricating oils, such as are obtained from petroleum or shale oil.

Hitherto, the accepted method of refining mineral lubricating oils to obtain a satisfactory purified product has consisted of a process in which the mineral lubricating oil stock is first treated with sulfuric acid. The sulfuric acid reacts upon the oil stock to produce a heavy sludge, the greater portion of which settles out from the stock. There remains in the oil, however, an appreciable amount of very finely divided sludge and other products of reaction which cannot be completely removed from the oil, even when the oil is subjected to a long period of settling. It is hence usual in the refining of mineral lubricating oils to then apply to the lubricating oil a substance which will act to "gather" this finely divided sludge. The most common agent employed for this purpose is water, and the operation of gathering the sludge by water is generally termed "water gathering". The removal of finely divided sludge by such conventional water gathering method is, however, attended by certain marked disadvantages and objectionable features, chief among which is the fact that the water reacts with the sludge and reaction products releasing certain oil soluble sulfonated bodies, as well as certain color bodies which are redissolved by the treated oil. Upon subsequent neutralization of the oil stock with caustic soda or the like, these bodies react therewith, forming emulsifying agents which produce serious emulsion problems in the further treatment of the oil stock.

Moreover, the water gathering method of removing the suspended sludge from the oil stock is not capable of removing all of such sludge therefrom. As a result of this it is necessary to employ a large amount of alkali upon the oil stock in order to completely neutralize the acidity of the oil. Moreover, when such water gathering operation is employed, the finely divided sludge particles left in the oil remain with the oil throughout the subsequent neutralization and washing steps and finally result in the production of treated oil of very low color. When such oil is attempted to be decolorized and clarified to a proper color standard, a low filtering yield is then experienced.

In the treatment of certain very heavy and viscous lubricating oils with sulfuric acid, it is often necessary, in order to free the oil of even the bulk of the sludge produced thereby and to remove the acidity of the oil, to subject the resulting mixture of oil and sludge to a reducing operation, i. e.—a distillation operation in which the oil stock is distilled off, leaving the sludge as a residue. Inasmuch as a certain amount of mineral acid is present in the oil, along with the acid-like sludge material, such an operation is of necessity attended with a severe deterioration of the equipment in which the acidified oil with its sludge content is distilled.

We have discovered that by subjecting an acid treated lubricating oil stock, after the removal therefrom of such of the sludge as will conveniently settle out by gravity through a mechanical filtration through certain filter beds, and preferably by upward filtration through said filter beds, the finely divided sludge particles may substantially completely and effectively be removed so that the conventional water gathering step for the removal of such finely divided sludge may be omitted. By thus removing completely the finely divided sludge particles prior to the application of alkali for neutralizing the acid in the oil, we also prevent these particles of sludge from coming in contact with water present in the alkali solutions employed for neutralizing the oil. There is thus prevented the reaction which has hitherto taken place between the finely divided sludge and water and the disadvantages which have hitherto attended the treatment of lubricating oils wherein a water gathering step has been practiced.

Moreover, it is possible by such method of removing sludge from lubricating oil stock, to remove sludge from heavy viscous oils without such viscous oils having to be reduced or distilled in the presence of acid sludge, and thus such expensive operation eliminated.

Another advantage of our invention resides in the fact that less alkali solution is required for the complete neutralization of the oil due to the more complete removal of the sludge from the oil stock. Moreover, the more thorough and complete removal of such sludge results in the production of an oil of higher color and an oil which contains less emulsion-producing compounds, resulting in a lower emulsification loss in treatment.

Various other advantages of our invention will appear from an example of a preferred method of treating lubricating oils embodying our invention, as conducted in the apparatus illustrated in the accompanying drawings.

In the drawings, there is indicated in elevation, and mainly in vertical section, an apparatus in which the present process may be conducted.

In the preferred method of treating mineral lubricating oils, we employ a filter-bed of sawdust. It is found, however, that sawdust may contain oil soluble resins and other caustic bodies which may prove more or less destrimental to the oil. We prefer, therefore, first to treat the sawdust for the removal of such oil soluble resins and the like. This may be accomplished by the use of organic solvents such, for example, as alcohol, benzol, petroleum distillates or the like, or such oil soluble resins may be treated with chemicals such as alkali, thus converting the resins to a form insoluble in the mineral lubricating oil. It is understood that the term "removing the oil soluble resins" includes both of such methods. The sawdust is then strained or washed with water to remove any traces of the treating agent upon it, together with any reaction products that may have been formed, subsequent to which the sawdust is than dried.

As a specific example of such a treatment, sawdust is first sifted through a screen, preferably of about thirty mesh, in order to remove any large particles therefrom, thus preventing the tendency of the sawdust to become grooved and channeled during the subsequent oil filtering operations. The sawdust is then treated with sodium hydroxide solution of substantially 15° Baumé gravity. The amount of such caustic required is approximately .15 gallons of caustic solution per pound of sawdust treated. The sawdust, subsequent to the caustic treatment, is then washed with water and dried. The treated sawdust is then ready to be charged into the filtering apparatus illustrated in the accompanying drawings, the apparatus comprising a treater F having a conical shaped bottom G. The treater is provided with a perforated lead plate B or other filter medium supporting means which is unaffected by the acidified oil which is to be processed. Said plate B is located at the bottom of the shell of the treater and therefore directly over the conical bottom G of the vessel. Such perforated plate is then covered with a screen such as 100 mesh brass screen which affords a support to the filter medium. At the top of such brass screen there is then placed a filter medium preferably of a height of two or three feet, the filter medium of sawdust being thoroughly tamped into place to prevent subsequent channeling or grooving of the filter medium by the oil passed therethrough. The sawdust or filter medium is indicated by C in the drawings. At the top of the sawdust or filter medium there is then placed another screen such as a second one-hundred-mesh screen H and above such brass screen there is placed a second perforated plate or filter supporting means I.

The apparatus is then ready for the treatment of the mineral lubricating oil. It is understood that such oil is any fraction of mineral oil of sufficient viscosity to act as a lubricant, which lubricating stock has been treated with sulfuric acid.

The treatment with sulfuric acid may have been carried on in any preferred or customary manner, for example, the oil may be treated with one or more applications of acid in proportions of, for example, one-fourth to three-fourths pound of acid per gallon of oil, the acid being 66° Baumé in strength. Said acid treated oil from which the bulk of the produced sludge has been removed is charged into the filter through a line A which enters the vessel near the top of the cone F. The oil passes by upward filtration through the layer of sawdust or other filter medium and passes out from the vessel through the conduit D communicating with the vessel near the top. The upward filtration of the lubricating oil stock is to be preferred, for the reason that the difference in specific gravity between the oil stock and the heavier sludge particles aids in effecting a separation and particularly a removal from the oil of the sludge particles. As the heavy particles accumulate on the under side of the filter, the weight of such sludge particles cause the same to break loose therefrom and to settle through the lighter oil and accumulate in the bottom of the cone G of the treater, where the sludge may be drawn off through passage E.

The capillary attraction of the sawdust has the effect of rapidly absorbing the oil, causing effective cleaning, since any moisture or any foreign matter is rapidly absorbed or held back by the sawdust, thus allowing only the clean oil to filter through. Subsequently, the clean filtered oil is neutralized with alkali solution in any usual or preferred manner, for example, with sodium hydroxide of 15° Baumé gravity, the neutralization being accomplished in the usual manner either by mixing the caustic solution with the oil by agitation with air or by the addition of caustic to the oil in a transfer line or pump, or by any other method of mixing.

By the practice of the method of this invention, the quantity of caustic solution required for neutralizing is materially decreased; in fact, the decrease amounts to approximately 90%. Moreover, on account of the small quantity of alkali necessary for the neutralizing operation, it is possible to more readily separate the spent caustic and neutralized reaction products from the oil so that such separation may take place at low temperatures or without heating the oil. Furthermore, the separation of the neutralized stock from the products of reaction may be advantageously accomplished by passing the neutralized stock through a second filter. The second filter may be similar to that employed in the upward filtration process referred to, or may comprise combinations of cleaning or filtering mediums with fuller's earth and other decolorizing and cleansing agents. The effect of such second filtration operation is to thoroughly cleanse the oil of all waste alkali and reaction products, these materials being drawn off through the bottom of the cone of said second filter in the same manner as the sludge is removed from said first filter. This second filtration, moreover, removes the water from the oil and thus eliminates the necessity for removing such water by the usual brightening or air-blowing process, and the oil may be directly decolorized or further treated as and if desired.

While in the preferred example of a process embodying the invention, sawdust is described as the preferred filtering agent, other filtering mediums have been found satisfactory, such mediums including cellulose, paper pulp, and finely divided lead particles. Likewise, other metal substances or alloys may be employed in lieu of the brass screens heretofore referred to. For example, lead wool has been found satisfactory for this purpose.

While in the preferred embodiment of our invention we employ an upward filtration operation, the finely divided particles of sludge may be removed from the oil by the employment of a downward or percolation system for the filtration. When employing downward filtration of the oil, it is also advantageous to mix with the sawdust a quantity of fine clay in order to better clarify the oil or in order to clarify and decolorize the oil simultaneously with the removal of the products of neutralization. Such clay may also be added to the sawdust during the upward filtration process.

Through the elimination of the water gathering step and the complete removal of the finely divided sludge particles so that the same do not come in contact with the water which is present in the required neutralization solution, the detrimental liberation of oil soluble sulfonated bodies and color bodies is thus prevented, with the result that the emulsion troubles and expensive and difficult methods of combatting emulsion troubles are materially reduced and in many instances completely eliminated. Through the practice of the present method of refining lubricating oils, we are able to prevent the waste of emulsified oil stock which attends the treatment of oils by the prior generally practiced methods. By virtue of this freedom from emulsion troubles, the neutralizing agent may also more effectively act upon the acidity of the oil, and as a result thereof we produce a lubricating oil stock of low organic acidity. Moreover, the finished oil stock is of higher color and requires less decolorizing treatment.

Moreover, by the practice of our invention, it is possible to remove sludge from heavy viscous oils, thereby making it possible to neutralize and filter such oils without the practice of employing the expensive operation of reducing the oils in an acid state.

While we have described a preferred example of a process embodying the present invention, it is understood that various modifications may be made in the details of the process without departing from the principles of the invention, and the invention includes all such modifications and changes as come within the scope of the appended claims.

We claim:—

1. A method of refining mineral lubricating oils, which comprises treating the oils with sulfuric acid, settling and removing the settled sludge, then filtering the oil without the addition of water thereto through a cellulosic filtering agent to remove the suspended sludge, and neutralizing the filtered oil.

2. A method of refining mineral lubricating oils, which comprises treating the oils with sulfuric acid, settling and removing the settled sludge, then filtering the oil through sawdust to remove the suspended sludge, and neutralizing the filtered oil.

3. A method of refining mineral lubricating oils, which comprises treating the oils with sulfuric acid, settling and removing the settled sludge, then passing the oil without the addition of water thereto upwardly through a bed of cellulosic filtering material to remove the suspended sludge, and neutralizing the filtered oil.

4. A method of refining mineral lubricating oils, which comprises treating the oil with sulfuric acid, settling and removing the settled sludge, then passing the oil upwardly through a bed of sawdust, and neutralizing the filtered oil.

5. A method of removing suspended sludge from acid treated lubricating oil comprising, passing such oil through a bed of cellulosic material substantially free from oil soluble resins.

6. A method of removing suspended sludge from acid treated lubricating oil comprising, passing such oil through a bed of substantially dry cellulosic material previously washed with a resin solvent.

Signed at Richmond, Cal., this 13th day of October, 1925.

EDWIN D. GRAY.
EARLE L. SCOFIELD.
EDWARD C. DEFOE.